United States Patent [19]

Worrallo

[11] 4,207,014
[45] Jun. 10, 1980

[54] HOLLOW ROD JOINT CONNECTION

[76] Inventor: Anthony C. Worrallo, 15, Sprott Rd., Auckland 6, New Zealand

[21] Appl. No.: 881,591

[22] Filed: Feb. 27, 1978

[51] Int. Cl.² .......................... B25G 3/00; F16B 7/04
[52] U.S. Cl. .................................. 403/187; 403/344; 403/406; 403/264
[58] Field of Search ............... 403/406, 407, 231, 254, 403/255, 252, 264, 344, 187, 188, 189, 294, 295, 297, 343; 248/188 R; 256/65, 68

[56] References Cited

U.S. PATENT DOCUMENTS

| | | | |
|---|---|---|---|
| 2,878,080 | 3/1959 | Brutosky | 403/344 |
| 3,672,710 | 6/1972 | Kroop | 403/252 |
| 4,017,199 | 4/1977 | Strassle | 403/264 |

FOREIGN PATENT DOCUMENTS 1425603  2/1976  United Kingdom ............... 403/264

*Primary Examiner*—Wayne L. Shedd
*Attorney, Agent, or Firm*—Roylance, Abrams, Berdo & Farley

[57] ABSTRACT

A jointing device including arms which connect two elements together. The arms are elongated and of generally rectangular cross-section. One of the elements includes flanges with lips extending along the edges of the flanges and the other of the elements forms a clip. The lips form a mouth. Each arm is grooved near one end, the grooves extending transversely across one of the elongated faces of the respective arm. Said one end of each arm is bounded by a rolling surface which intersects said one surface of each arm and merges with the opposed surface. With the rolling surfaces in engagement, the arms diverge from said one end and, in this condition, can be inserted into, and removed from, said mouth. When the outer ends of the arms are moved together from this diverging position, the arms are brought into back-to-back relationship with the opposed surfaces juxtaposed. The lips are received in the grooves while the arms are held in back-to-back relationship in the mouth. The arms are held in this relationship by the second element which straddles the arms. The lips are forced apart as the arms are brought into this relationship because the distance between the bottoms of the grooves is greater than the initial distance between the lips.

10 Claims, 4 Drawing Figures

HOLLOW ROD JOINT CONNECTION

This invention relates to jointing devices.

According to the present invention there is provided a jointing device comprising first and second elements and a pair of arms, the first element including two spaced apart portions which together define a mouth, and each arm having two opposed, elongated faces with a transverse groove in one of said faces adjacent one end thereof which grooves receive said portions when the arms are located in said mouth with the other of said opposed faces thereof in juxtaposed relationship, the distance between the bottom surfaces of said grooves of said arms being greater than the width of said mouth between said portions before insertion of the arms therein so that said arms hold said portions apart, said one end of each arm being bounded by a rolling surface which merges with said other face and intersects said one face, said rolling surface enabling said arms to roll one on the other between a position in which said other surfaces are in juxtaposed relationship and a position in which said rolling surfaces are in engagement with said arms diverging from said one end, said arms being inserted into and removed from said mouth while in this diverging relationship, and said second element forming a clip to prevent said arms moving to said diverging relationship.

To prevent said portions interfering with the arms when the arms are to be moved from their back-to-back relationship to their diverging condition, each groove is bounded by said bottom surface and two further surfaces which intersect said one face, that one of said further surfaces which is closest to said one end being normal to said one face and the other of said further surfaces being oblique to said one face whereby the mouth of each groove is wider than its base. The other of said further surfaces can intersect said one face at 45°.

The arms can further include a generally vee-shaped further transverse groove in each of said one faces, that bounding face of each of these grooves which is furthest from said one end of the arm being oblique to said one face. Additionally, a transverse, half-round groove can be provided in each of said other faces, said half round grooves registering to form a hole when said other faces are juxtaposed.

Each rolling surface preferably has a spiral like form and comprises a first curved portion of relatively small radius, the first curved portion intersecting said one face, a second curved portion of relatively large radius merging with said other face, and a flat portion between the curved portions and merging therewith.

For a better understanding of the present invention, and to show how the same may be carried into effect, reference will now be made, by way of example, to the accompanying drawing in which:

FIG. 1 diagrammatically illustrates a jointing device during assembly;

Figure 1:
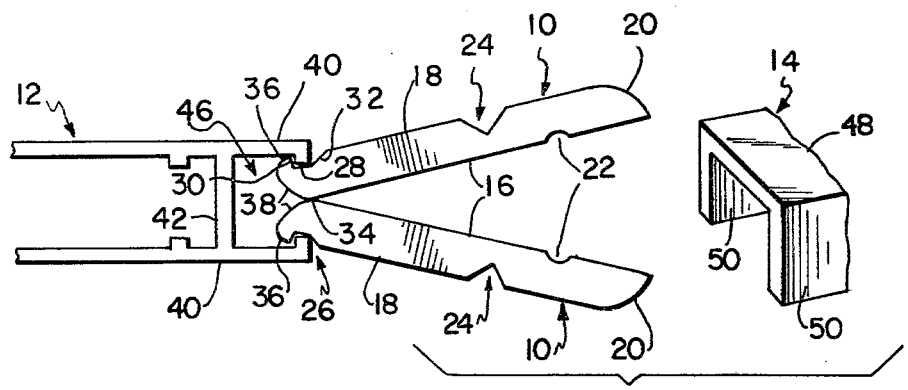
Figure 2:
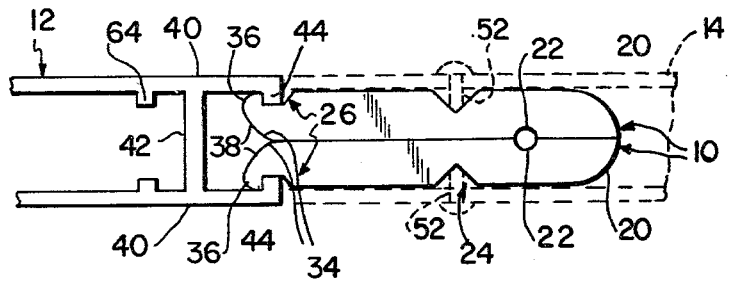
FIG. 2 is a plan view showing the jointing device in its assembled condition.

Referring firstly to FIGS. 1 and 2, the jointing device illustrated comprises a pair of arms 10, an element 12 providing a lipped channel, and a clip 14. Each arm 10 is a short section of aluminium extrusion and has a flat inner face 16 and a flat outer face 18. At the end thereof remote from the element 12 each outer face 18 is joined to the respective inner face 16 by means of a radiussed face 20, the face 20 being a "quarter round".

A semi-circular groove 22 is formed in each face 16 at a point which is spaced from the intersection between the faces 16 and 20 by a distance which is equal to approximately one quarter of the length of the arm. A vee-shaped groove 24 is provided in each of the outer faces 18, the grooves 24 being approximately midway between the ends of the arms. The faces of the grooves 24 meet the faces 18 at 45° angles.

Locating grooves 26 are provided adjacent the inner end of each arm 10. Each groove 26 has a bottom surface 28 which is parallel to the faces 16 and 18. The remaining surfaces which bound the grooves 26 are referenced 30 and 32. The surface 30 is at 90° with respect to the face 18 and the bottom surface 28 whereas the surface 32 slopes at an angle of approximately 45° with respect to the surface 28 and the face 18. Thus the mouth of the groove is wider than its base.

Radiussed surfaces 34 and 36 of each arm merge with opposite edges of a short, flat, angled face 38 and, respectively, merge with the flat face 16 and intersect the face 18. The face 38 is angled at 45° with respect to the faces 16 and 18 and the radiussed surface 36 is a quarter round. Each face 38 with the surfaces 34 and 36 on each side thereof constitutes a rolling surface.

The element 12 comprises two flanges 40 which are joined by a web 42. The flanges 40 extend beyond the web 42 and, at their outer extremities, carry lips 44 which are directed towards one another to define the mouth of a channel 46 constituted by the web 42 and those portions of the flanges 40 which project beyond the web. It will be understood that the part of the element 12 which has not been shown can be a mirror image of that illustrated.

Certain dimensions of the element 12 in relation to dimensions of the arms 10 are of significance. Thus the dimension of each surface 28, measured between its intersections with the surfaces 30 and 32, is equal to the thickness of the lips 44. Additionally, the distance from each surface 28 to the face 16 of the respective arm is greater than half the distance between the opposed surfaces of the lips 44.

The clip 14 in its simplest form (see FIG. 1) is a downwardly open channel having an upper web 48 and two depending flanges 50.

To assemble the jointing device, the two arms 10 are inserted into the channel 46 through the mouth defined by the lips 44. One way of doing this is to place the faces 38 in contact with one another which means that the arms 10 are then approximately at right angles to one another. In this condition, the distance between the point on one arm at which the surface 30 intersects the face 18 and the corresponding point on the other arm is less than the width of the mouth of the channel 46 measured between the lips 44. The arms are then presented to the mouth so that inner end portions of the arms 10 enter the channel 46.

Pressure is then exerted on the free outer ends of the arms 10 so that the faces 16 are brought together. During this movement the rolling surfaces roll on one another. As the arms move towards a parallel, face-to-face condition the bottom surfaces 28 act on the lips 44 thereby distorting the channel 46 slightly by urging the lips 44 apart. As will be understood from the description above, the distance between the two surfaces 28, in the condition of the arms illustrated in FIG. 2, is greater than the width of said mouth between the lips 44.

To maintain the arms 10 in the condition illustrated in FIG. 2, the clip 14 is placed over the arms, the flanges 50 resisting any tendency of the arms to move back towards the position shown in FIG. 1. Because the channel 46 has been distorted there is inherently a tendency for the inner ends of the arms 10 to be forced together which, if not restrained, would result in the arms moving back towards the position shown in FIG. 1.

The surfaces 30 and 32 now lie inwardly and outwardly of the lips 44 and thus the arms 10 cannot be pushed further into the channel 46 or pulled out of the channel.

The web 48 of the clip 14 has a hole (not shown) therein which, by suitably positioning the clip 14 with respect to the arms 10, can be brought into alignment with the hole which is now defined by the co-operating grooves 22 (FIG. 2). A screw, nail, pin or other fastening element can then be passed through the aligned holes so as positively to locate the clip 14 in position with respect to the arms 10.

Two further holes 52 (see FIG. 2) can be provided in the flanges 50 of the clip 14, these initially being aligned with those inclined faces of the vee-grooves 24 which are furthest from the element 12. Self tapping screws S entered in the holes 52, by co-operating with said inclined faces, serve to displace the clip 14 firmly into engagement with the outer faces of the lips 44.

The clip 14 described can be placed over the arms 10 from above or pushed onto the juxtaposed arms 10 from the free ends of the arms.

Figure 3:
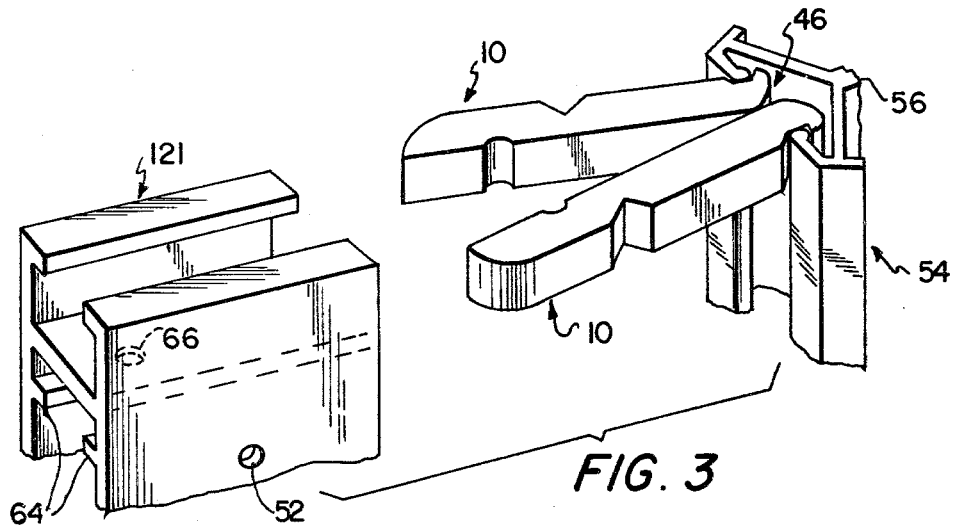
FIG. 3 is a pictorial view showing a further jointing device during assembly.
Figure 4:
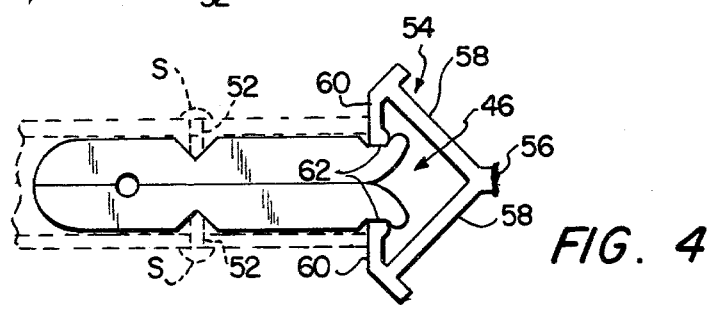
FIG. 4 is a top plan view showing the device of FIG. 3 in its assembled condition.

Turning now to FIGS. 3 and 4, these illustrate a jointing device in which an element 12.1 of the same form as the element 12 of FIG. 1 is used to hold the arms 10 in the position in which the faces 16 are in engagement one with the other. The inner ends of the arms 10 are engaged with one of the channels 46 of a post 54 which includes a central core 56 and a plurality of radial arms 58. The arms 58 terminate in flanges 60 which in turn have lips 62 along their free edges. These lips are equivalent to the lips 44 of FIGS. 1 and 2.

The protrusions 64 formed on the inner faces of the flanges 40 below the web 42 rest on the upper faces of the arms 10. A screw hole 66 is shown in FIG. 4, this being aligned with the hole constituted by the grooves 22 when the element 12 is in position.

The frictional engagement between the arms 10 and the lips 44 or 62 prevents movement of the arms 10 with respect to the element 12 or post 54.

An advantage of the structure described is that vertical or horizontal joints can be added to a frame structure without the necessity of disassembling any existing joints. Where the clip 14 or element 12.1 extends horizontally it may support shelving, and if it extends vertically it may form a foot for the frame structure or part of a column. It will be understood that by appropriately shaping the clip 14 or element 12.1 it can be arranged to lie in an inclined position.

I claim:

1. A jointing device comprising
    a first element including two spaced apart portions interconnected to form a mouth;
    a pair of arms, each arm having two opposed elongated faces,
    a front one of said faces on each arm having means defining a transverse groove near one end thereof to receive one of said portions,
        said arms being positionable with the back faces thereof juxtaposed with the front faces having said
        grooves facing outwardly, in which position the distance between the innermost surfaces of said grooves is greater than the normal spacing between said portions on said first element before insertion of said arms,
        said one end of each arm having a curved, rolling surface merging with said back face thereof and terminating at said front face to permit said one end of said arms to be inserted into said mouth, such that said arms can be rolled from a diverging relationship into the juxtaposed position and to deform outwardly the portion of said mouth engaged by said grooves; and
    a second element comprising clip means engageable with said arms in said juxtaposed position for preventing said arms from moving toward the diverging position under the influence of the force exerted on said arms by said portion as said first element tends to return to said undeformed condition.

2. A device as claimed in claim 1, wherein said first element includes two flanges, said portions being protrusions extending along the free edges of said flanges.

3. A device as claimed in claim 1 wherein each groove is bounded by said bottom surface and two further surfaces which intersect said one face, that one of said further surfaces which is closest to said one end being normal to said one face and the other of said further surfaces being oblique to said one face whereby the mouth of each groove is wider than its base.

4. A device is claimed in claim 3, wherein said other of the further surfaces intersects said one face at 45°.

5. A device as claimed in claim 1 and including a generally vee-shaped further transverse groove in each of said one faces, that bounding face of each of these grooves which is furthest from said one end of the arm being oblique to said one face.

6. A device as claimed in claim 5, wherein said second element has holes therein which register with the oblique bounding faces.

7. A device as claimed in claim 1 and including a transverse, half-round groove in each of said other faces, said half round grooves registering to form a hole when said other faces are juxtaposed.

8. A device as claimed in claim 7, wherein said second element has a hole therein which is axially aligned with the hole formed by said two half round grooves.

9. A device as claimed in claim 1, wherein each rolling surface comprises a first curved portion of relatively small radius, the first curved portion intersecting said one face, a second curved portion of relatively large radius merging with said other face, and a flat portion between the curved portions and merging therewith.

10. A jointing device according to claim 1 wherein said first element comprises an elongated member and said two portions include elongated flanges having elongated surfaces facing toward each other, said surfaces being substantially continuous and uniformly spaced apart.

* * * * *